US012618550B1

(12) United States Patent
Liu

(10) Patent No.: US 12,618,550 B1
(45) Date of Patent: May 5, 2026

(54) EASY-TO-INSTALL LAMP

(71) Applicant: Guangdong Bravo New Energy Technology Co. LTD., Foshan City (CN)

(72) Inventor: Ziang Liu, Foshan City (CN)

(73) Assignee: Guangdong Bravo New Energy Technology Co. LTD., Foshan City (CN)

(*) Notice: Subject to any disclaimer, the term of this patent is extended or adjusted under 35 U.S.C. 154(b) by 0 days.

(21) Appl. No.: 18/946,227

(22) Filed: Nov. 13, 2024

(30) Foreign Application Priority Data

Nov. 6, 2024 (CN) ......................... 202422705196.6

(51) Int. Cl.
*F21V 23/06* (2006.01)
*F21V 21/008* (2006.01)

(52) U.S. Cl.
CPC ............ *F21V 23/06* (2013.01); *F21V 21/008* (2013.01)

(58) Field of Classification Search
CPC ...... F21V 23/008; F21V 23/001; F21V 23/06; F21V 19/001; F21V 19/00; F21V 19/015; F21V 21/008
See application file for complete search history.

(56) References Cited

U.S. PATENT DOCUMENTS

| | | | | |
|---|---|---|---|---|
| 3,247,368 | A * | 4/1966 | Mchugh | F21V 19/00 362/228 |
| 7,401,942 | B1 * | 7/2008 | Verfuerth | F21S 8/06 362/225 |
| 2017/0030566 | A1 * | 2/2017 | Milam | F21V 29/773 |
| 2017/0102113 | A1 * | 4/2017 | Wu | F21S 8/061 |

FOREIGN PATENT DOCUMENTS

| | | | | |
|---|---|---|---|---|
| CN | 106704929 | A * | 5/2017 | F21S 8/061 |

OTHER PUBLICATIONS

Innovation Q+ NPL Search (Year: 2025).*

* cited by examiner

*Primary Examiner* — Anabel Ton

(57) ABSTRACT

An easy-to-install lamp includes a lamp body and a connecting device. The lamp body includes a lamp housing, a light source board is arranged in the lamp housing, a lamp cover is arranged on the light source board, the lamp housing is equipped with a conductive terminal, one end of the conductive terminals is electrically connected to the light source board, and the other end of the conductive terminals is configured to be electrically connected to an external power source, enabling the lamp to be powered on and work, one end of the connecting device is configured to be detachably connected to an external wall, and the other end of the connecting device is connected to the lamp housing.

19 Claims, 11 Drawing Sheets

EASY-TO-INSTALL LAMP

CROSS-REFERENCE TO RELATED APPLICATIONS

The present invention claims priority of Chinese patent application CN 202422705196.6, filed on Nov. 6, 2024, which is incorporated herein by reference in its entireties.

TECHNICAL FIELD

The present invention relates to the field of light fixtures, in particular to an easy-to-install lamp.

BACKGROUND

At present, most of the lamps on the market are complicated to assemble. Basically, they are mainly fastened by screws or a combination of screws and buckles. When installing with screws, an electric screwdriver is frequently used to pick up the screws, align them and drive them in, and this process is repeated. Firstly, it increases the operational steps of installation, reduces the installation speed, and leads to an increase in product materials and labor costs. Secondly, if the torque is not well controlled when tightening the screws, greater mechanical stress will be generated, causing larger deformations of the components, and even resulting in bursting.

SUMMARY

In order to overcome the deficiencies of the existing lamp, the present invention provides a lamp that is easy to install. Without the need for complicated tools, the installation and disassembly of this lamp can be easily accomplished, thus enhancing the user experience.

An easy-to-install lamp includes a lamp body and a connecting device, wherein the lamp body includes a lamp housing, a light source board is arranged in the lamp housing, a lamp cover is arranged on the light source board, the lamp housing is equipped with a conductive terminal, one end of the conductive terminals is electrically connected to the light source board, and the other end of the conductive terminals is configured to be electrically connected to an external power source, enabling the lamp to be powered on and work, one end of the connecting device is configured to be detachably connected to an external wall, and the other end of the connecting device is connected to the lamp housing.

Further, the lamp body is further equipped with a circuit board, the circuit board is electrically connected to the light source board and the conductive terminal, the conductive terminal is configured to be electrically connected to the external power source through a power cord, and a length of the power cord ranges from 500 mm to 5000 mm.

Further, the connecting device includes a connecting frame, one end of the connecting frame is configured to be detachably connected to a mounting bracket on the external wall, and the other end of the connecting frame is detachably connected to the lamp housing.

Further, the connecting device includes a hook assembly arranged on each of two ends of the lamp housing.

Further, at least one clamping block extending in a direction away from the connecting frame is arranged on the connecting frame, at least one clamping groove cooperating with the clamping block is arranged on the lamp housing, and the clamping block is inserted into the clamping groove, enabling the lamp body to be detachably connected to the connecting frame.

Further, the connecting frame includes a bottom plate and a connecting plate extending downward from an edge of each of two ends of the bottom plate, each of the two connecting plates includes a first connecting plate and a second connecting plate, the first connecting plate and the second connecting plate are arranged in a relatively inclined manner, and at least one of the clamping blocks is arranged at an edge of an inner sidewall of one end of the first connecting plate and the second connecting plate.

Further, the lamp housing includes a top wall and a first side plate extending obliquely downward from each of two sides of the top wall, a second side plate extends obliquely upward from an edge of the first side plate, and at least one clamping groove corresponding to the clamping block is arranged on the first side plate.

Further, an inner sidewall of the first connecting plate and an inner sidewall of the second connecting plate respectively abut against an outer sidewall of the first side plate, an outer sidewall of the first connecting plate and an outer sidewall of the second connecting plate abut against an inner sidewall of the second side plate, and the clamping block is inserted into the clamping groove, enabling the connecting frame to be detachably connected to the lamp housing.

Further, a connecting block extends from an edge of the inner sidewall of the first connecting plate at the other end, and the connecting block is able to be attached to the first side plate and is detachably connected through a first connecting piece.

Further, the connecting block is provided with a first connecting hole, the first side plate is provided with a second connecting hole at a position corresponding to the first connecting hole, and the first connecting piece passes through the first connecting hole and extends into the second connecting hole, enabling the connecting frame to be detachably connected to the lamp body.

Further, the second side plate is provided with an arc-shaped structure, and at least one part of the outer sidewalls of the first connecting plate and the second connecting plate is provided with an arc-shaped structure matched with the second side plate, enabling the outer sidewalls of the first connecting plate and the second connecting plate to be abutted with the second side plate.

Further, the connecting frame further includes an abutting plate extending downwards from two side edges of the connecting frame, and an edge of a bottom end of the abutting plate is abutted against an inner wall surface of the second side plate.

Further, the conductive terminal is arranged on the connecting frame, the bottom plate is provided with a first through hole, the first through hole is provided with a first cover plate, the first cover plate is provided with a first wiring hole, and the power cord extends outward from the first wiring hole and is electrically connected to an external power supply.

Further, the first wiring hole is further covered with a hole cover, and the hole cover is configured for covering and storing the power cord in the lamp housing.

Further, one end of the power cord is electrically connected to the conductive terminal, the other end of the power cord is provided with a plug, and the plug is configured to be electrically connected to the external power supply.

Further, the bottom plate is provided with a second through hole, the second through hole is provided with a second cover plate, the second cover plate is provided with a second wiring hole, a snap buckle is arranged in the second wiring hole, the snap buckle is provided with a fixing hole, one end of the power cord is fixed in the fixing hole, and the other end of the power cord extends outward from the fixing hole and is electrically connected to the external power supply.

Further, the hook assembly includes a first hanging member, a second hanging member and a first joining member, one end of the first hanging member and one end of the second hanging member are fixedly connected to the lamp housing respectively, the other ends of the first hanging member and the second hanging member intersect and are connected by the first joining member, a wall nail is connected to the first joining member, and the wall nail is configured to fixedly connect the hook assembly to a wall.

Further, the hook assembly includes a third hanging member and a fourth hanging member, the third hanging member includes a first connecting part and a second connecting part, one end of the first connecting part and one end of the second connecting part are respectively fixedly connected to the lamp housing, the other ends of the first connecting part and the second connecting part are connected by the fourth hanging member, enabling the third hanging member to have a V-shaped structure, and the wall nail is connected to the fourth hanging member and is configured to fixedly connect the hook assembly to the wall.

Further, two ends of the lamp body are detachably connected to a left end cover and a right end cover, the left end cover and the right end cover are respectively provided with a guide hole and a limit hole, the guide hole and the limit hole are configured to enable a second connecting piece to pass through so as to connect the lamp to the wall, an edge part of the guide hole intersects with an edge part of the limit hole, making the guide hole and the limit hole connect with each other, and a diameter of the guide hole is not less than a diameter of the limit hole.

Further, a first mounting seat is electrically connected to one end of the light source board, a switching device is arranged in the first mounting seat, the switching device is electrically connected to the light source board, the right end cover is further provided with a first wiring port, the first wiring port is connected to the first mounting seat, enabling the external power supply to be plugged into the first wiring port and be electrically connected to the light source board, a second mounting seat is electrically connected to the other end of the light source board, the left end cover is provided with a second wiring port, and the second wiring port is connected to the second mounting seat, enabling the external power supply to be plugged into the second wiring port and be electrically connected to the light source board.

The present invention has the following beneficial effects. The lamp is detachably connected to the external wall through the connecting device, which simplifies the installation process of the lamp. Without the need for complicated tools and techniques, the installation and disassembly of the lamp can be easily accomplished, thus enhancing the user experience.

BRIEF DESCRIPTION OF THE DRAWINGS

Implementations of the present invention will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present invention.

DETAILED DESCRIPTION OF THE EMBODIMENTS

Figure 1:
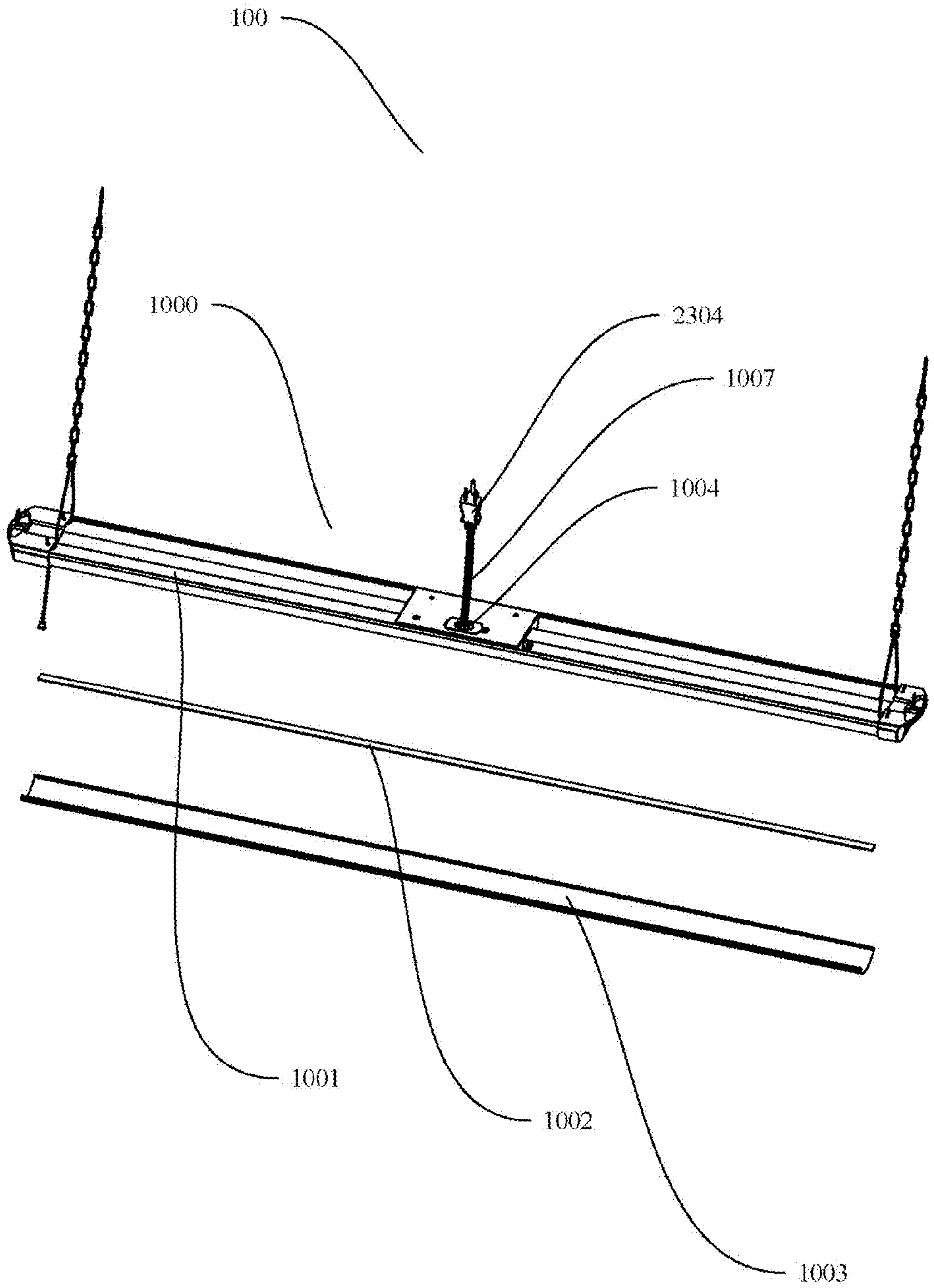
FIG. 1 is a schematic diagram of an overall structure of a lamp of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present invention.

The term "comprising" when utilized, means "including, but not necessarily limited to"; it specifically indicates open-ended inclusion or membership in the so-described combination, group, series, and the like. The invention is illustrated by way of example and not by way of limitation in the figures of the accompanying drawings in which like references indicate similar elements. It should be noted that references to "an" or "one" embodiment in this invention are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features.

In the description of embodiments of the application, "a plurality of" means two or more, unless otherwise specifically defined.

The present invention is provided with an easy-to-install lamp 100, referring to FIG. 1, the lamp 100 includes a lamp body 1000, the lamp body 1000 includes a lamp housing 1001, a light source board 1002 is arranged in the lamp housing 1001, a lamp cover 1003 is arranged on the light source board 1002, the lamp housing 1001 is equipped with a conductive terminal 1004, one end of the conductive terminals 1004 is electrically connected to the light source board 1002, and the other end of the conductive terminals 1004 is configured to be electrically connected to an external power source, enabling the lamp 100 to be powered on and work; the lamp 100 further includes a connecting device 2000, one end of the connecting device 2000 is configured to be detachably connected to an external wall, and the other end of the connecting device 2000 is connected to the lamp housing 1001. The lamp 100 is detachably connected to the external wall through the connecting device 2000, which simplifies the installation process of the lamp 100. Without the need for complicated tools and techniques, the installation and disassembly of the lamp 100 can be easily accomplished, thus enhancing the user experience.

In this embodiment, the lamp body 1000 is further equipped with a circuit board 1006, the circuit board 1006 is electrically connected to the light source board 1002 and the conductive terminal 1004, the conductive terminal 1004 is configured to be electrically connected to the external power source through a power cord 1007, and a length of the power cord 1007 ranges from 500 mm to 5000 mm. As a preferred embodiment of the present invention, the length of the power cord 1007 is 1200 mm.

Figure 2:
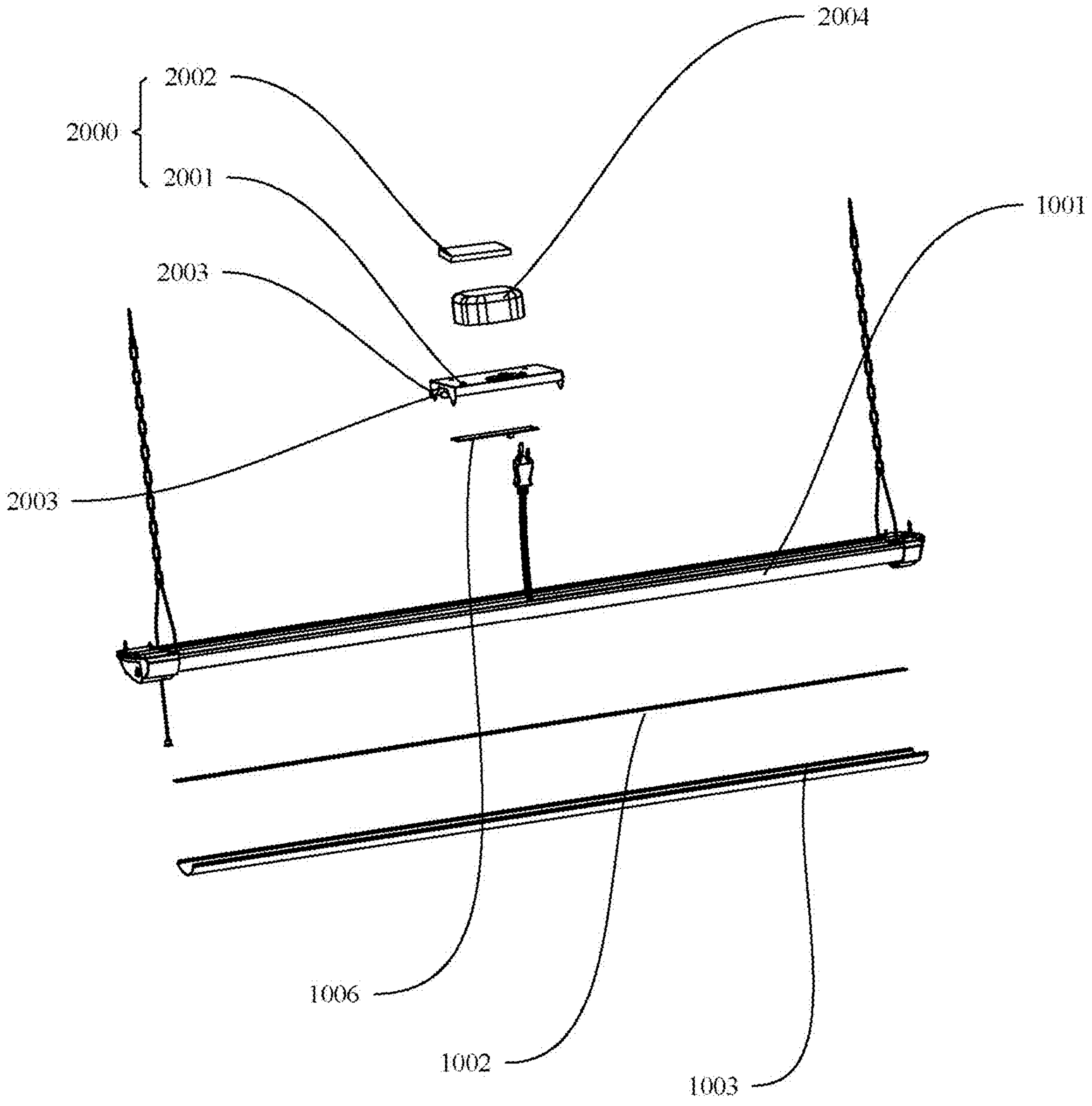
FIG. 2 is a schematic structural diagram of a first mounting method of the lamp of the present invention.

As a first mounting method of the lamp in the present invention, referring to FIG. 2, the connecting device 2000 includes a connecting frame 2001, one end of the connecting frame 2001 is configured to be detachably connected to a mounting bracket 2002 on the external wall, and the other end of the connecting frame 2001 is detachably connected to the lamp housing 1001. As a preferred arrangement of this mounting method, an electric wire box 2004 is installed recessedly in the external wall. When the lamp body 1000 is connected to the mounting bracket 2002 on the external wall through the connecting frame 2001, the electric wire box 2004 covering the conductive terminal 1004 can effectively protect it from the influences of the external environment, such as dust, moisture, etc., thereby improving the reliability of the electrical connection and prolonging the service life of the lamp 100.

In this embodiment, referring to FIG. 2, at least one clamping block 2003 extending in a direction away from the connecting frame 2001 is arranged on the connecting frame 2001, at least one clamping groove 1005 cooperating with the clamping block 2003 is arranged on the lamp housing 1001, and the clamping block 2003 is inserted into the clamping groove 1005, enabling the lamp body 1000 to be detachably connected to the connecting frame 2001. Thereby simplifying the installation process of the lamp housing 1001 and the connecting frame 2001. In another embodiment, a locking device is provided on the clamping block 2003. When the clamping block 2003 is inserted into the clamping groove 1005, the clamping block 2003 is locked inside the clamping groove 1005 by the locking device. The locking device effectively enhances the connection security and reduces the risk of the lamp accidentally falling off during the use process.

Figure 3:
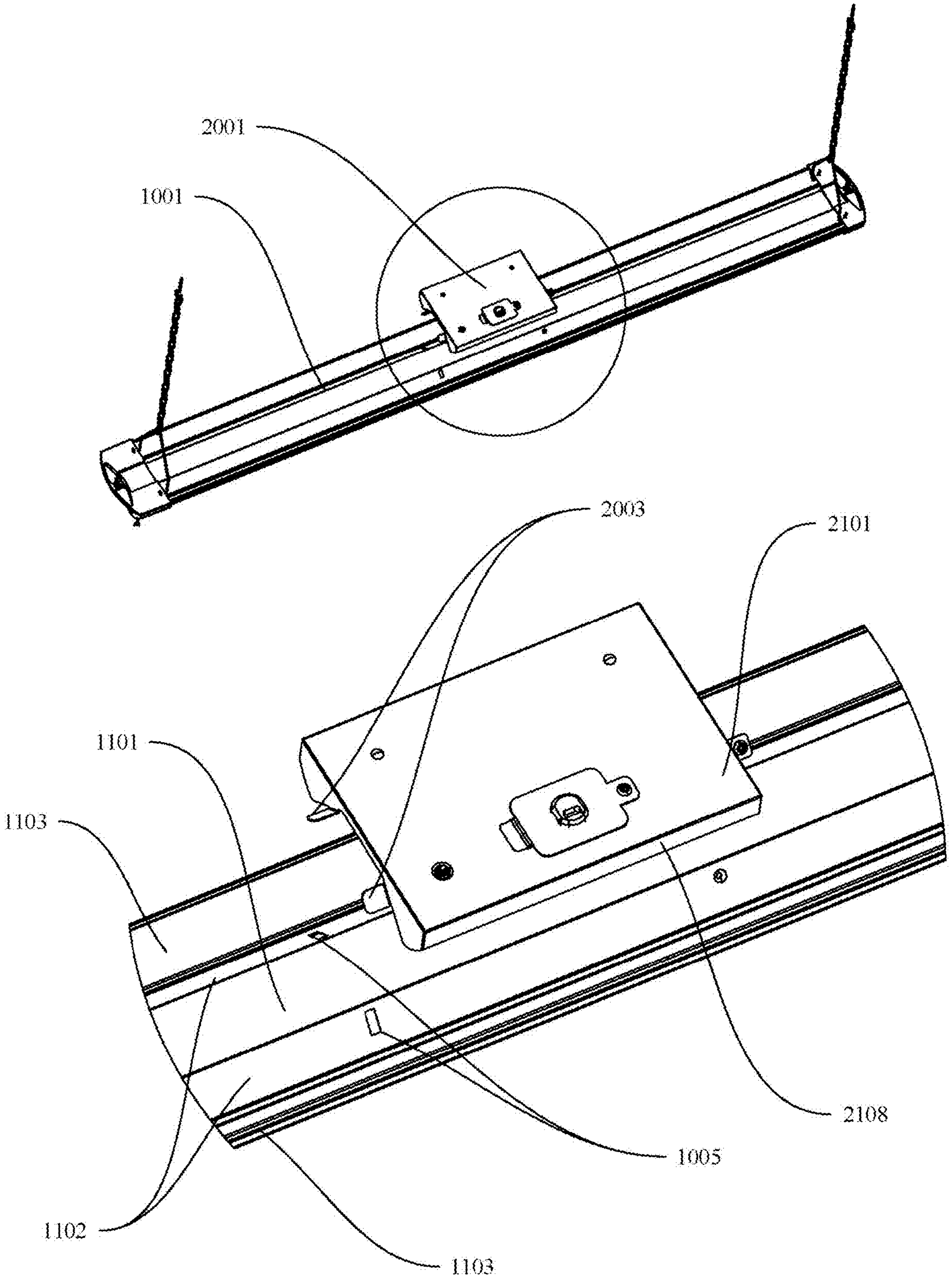
FIG. 3 is a schematic diagram of a connecting structure between a connecting frame and the lamp in the first mounting method of the lamp of the present invention.

In this embodiment, referring to FIG. 3, the connecting frame includes a bottom plate 2101 and a connecting plate 2102 extending downward from an edge of each of two ends of the bottom plate 2101, each of the two connecting plates includes a first connecting plate 2103 and a second connecting plate 2104, the first connecting plate 2103 and the second connecting plate 2104 are arranged in a relatively inclined manner, and one clamping block 2003 is respectively arranged at an edge of an inner sidewall of one end of the first connecting plate 2103 and the second connecting plate 2104. The first connecting plate 2103 and the second connecting plate 2104 are disposed in the relatively inclined manner, enabling the connecting frame to meet the installation requirements of different angles and positions, and enhancing the compatibility of the device.

In another embodiment, two clamping block 2003 are respectively arranged at the edge of the inner sidewall of one end of the first connecting plate 2103 and the second connecting plate 2104, or configured in any desired quantity. By arranging a greater number of clamping blocks 2003, the stability of the connection can be effectively enhanced, preventing the lamp 100 from accidentally getting loose or falling off during the use process.

Figure 4:
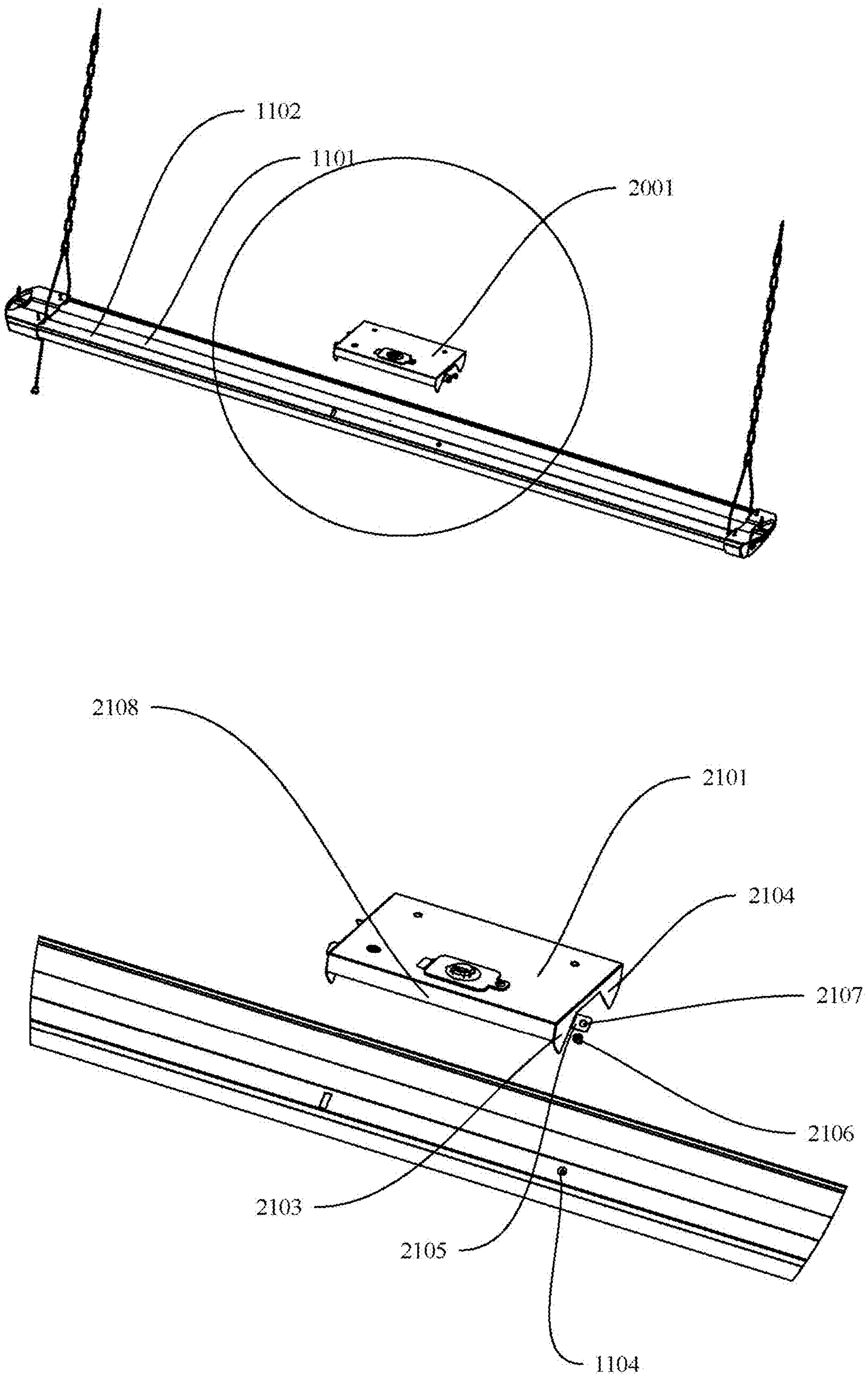
FIG. 4 is a schematic structural diagram of the connecting frame in the first mounting method of the lamp of the present invention.

In this embodiment, referring to FIG. 3 to FIG. 4, the lamp housing 1001 includes a top wall 1101 and a first side plate 1102 extending obliquely downward from each of two sides of the top wall 1101, a second side plate 1103 extends obliquely upward from an edge of the first side plate 1102, and at least one clamping groove 1005 corresponding to the clamping block 2003 is arranged on the first side plate 1102. An inner sidewall of the first connecting plate 2103 and an inner sidewall of the second connecting plate 2104 respectively abut against an outer sidewall of the first side plate 1102, an outer sidewall of the first connecting plate 2103 and an outer sidewall of the second connecting plate 2104 abut against an inner sidewall of the second side plate 1103, and the clamping block 2003 is inserted into the clamping groove 1005, enabling the connecting frame 2001 to be detachably connected to the lamp housing 1001. The inner sidewalls of the first connecting plate 2103 and the second connecting plate 2104 respectively abut against the outer sidewall of the first side plate 1102, and the outer sidewalls of the first connecting plate 2103 and the second connecting plate 2104 respectively abut against the inner sidewall of the second side plate 1103, which significantly enhances the stability between the lamp housing 1001 and the connecting frame 2001, ensuring the lamp 100 will not get loose or fall off during the use process.

In this embodiment, referring to FIG. 4, a connecting block 2105 extends from an edge of the inner sidewall of the other end of the first connecting plate 2103, and the connecting block 2105 is able to be attached to the first side plate 1102 and is detachably connected through a first connecting piece 2106. Specifically, the connecting block 2105 is provided with a first connecting hole 2105, the first side plate 1102 is provided with a second connecting hole 1104 at a position corresponding to the first connecting hole 2105, and the first connecting piece 2106 passes through the first connecting hole 2107 and extends into the second connecting hole 1104, enabling the connecting frame 2001 to be detachably connected to the lamp body 1000. By extending the connecting block 2105 from the edge of the inner sidewall of the first connecting plate 2103 and attaching it to the first side plate 1102 to form an additional connecting point, the first connecting piece 2106 is inserted through the first connecting hole 2107 and the second connecting hole 1104, further enhancing the stability between the connecting frame 2001 and the lamp body 1000, thereby ensuring that the lamp 100 will not get loose or fall off during the use process.

Figure 10:
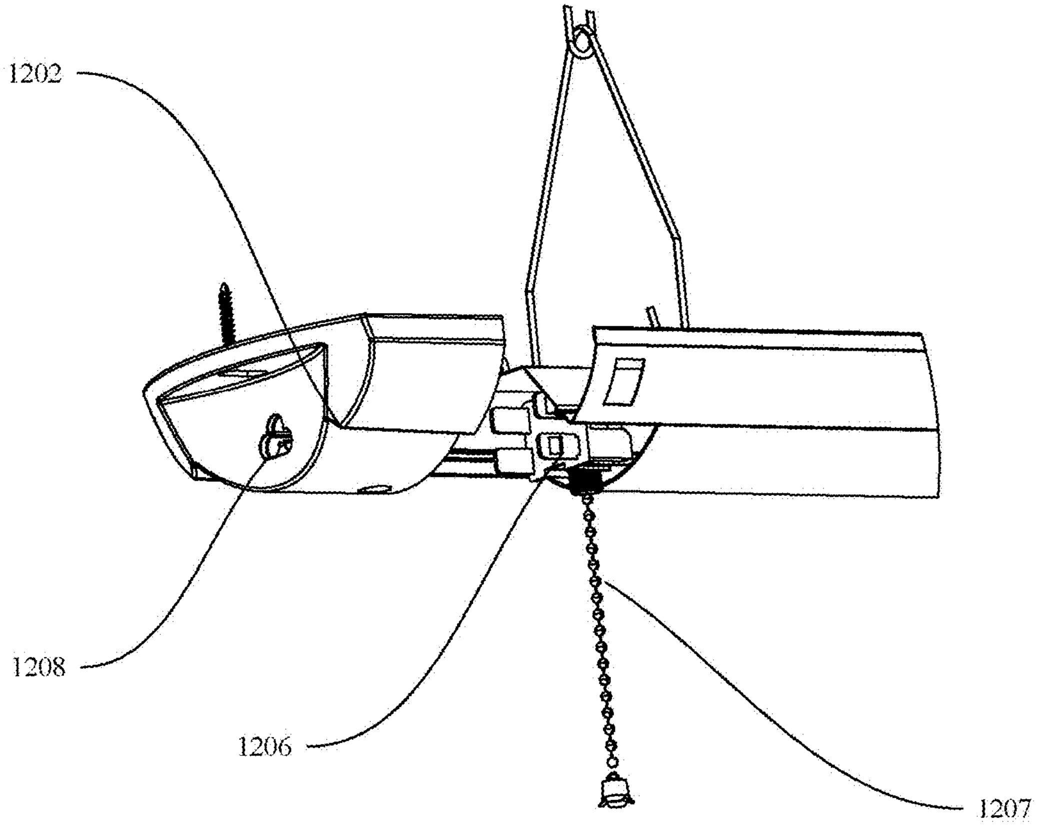
FIG. 10 is a partial enlarged structural diagram of an area A of FIG. 9.
Figure 11:
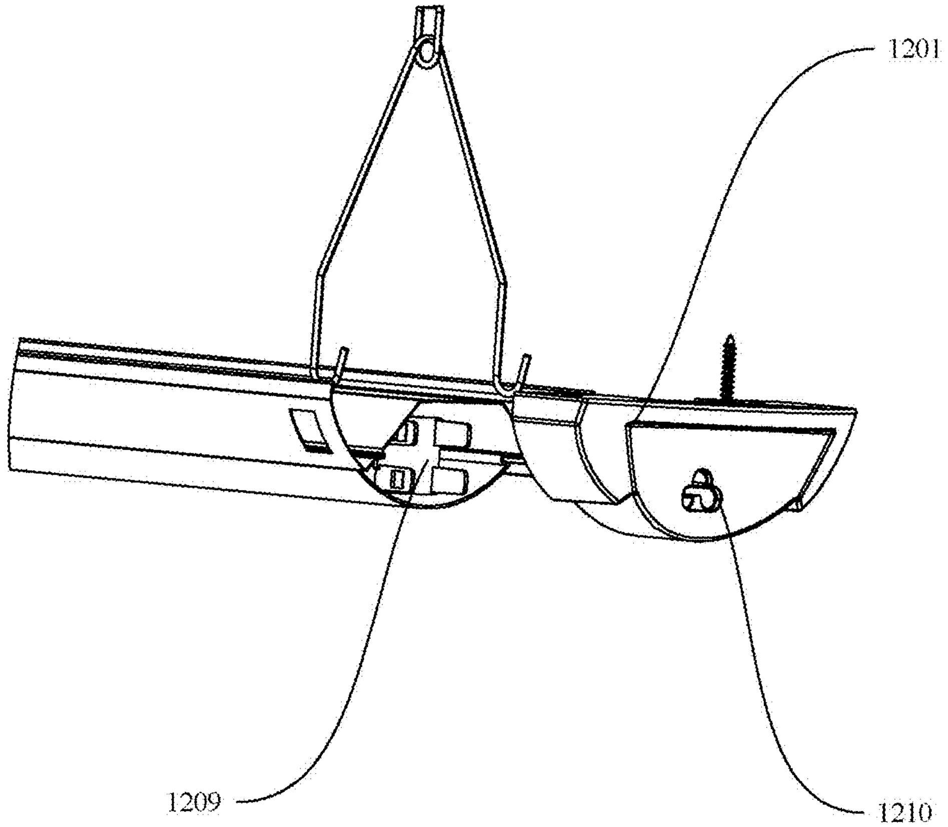
FIG. 11 is a partial enlarged structural diagram of an area B of FIG. 9.

In this embodiment, referring to FIG. 3, FIG. 10 and FIG. 11, the second side plate 1103 is provided with an arc-shaped structure, and at least one part of the outer sidewalls of the first connecting plate 2103 and the second connecting plate 2104 is provided with an arc-shaped structure matched with the second side plate 1103, enabling the outer sidewalls of the first connecting plate 2103 and the second connecting plate 2104 to be abutted with the second side plate 1103. The arc-shaped structure of the second side plate 1103 is matched with the arc-shaped structures of the outer sidewalls of the first connecting plate 2103 and the second connecting plate 2104, enabling them to be closely abutted to form a more stable connection, thereby ensuring that the lamp 100 will not get loose or fall off during the use process.

In this embodiment, referring to FIG. 4, the connecting frame 2001 further includes an abutting plate 2108 extending downwards from two side edges of the connecting frame 2001, and an edge of a bottom end of the abutting plate 2108 is abutted against an inner wall surface of the second side plate 1103. The abutting plate 2108 can enhance the load-bearing capacity of the connecting frame 2001, ensuring the safety and reliability of the lamp 100 during long-term use.

Figure 5:
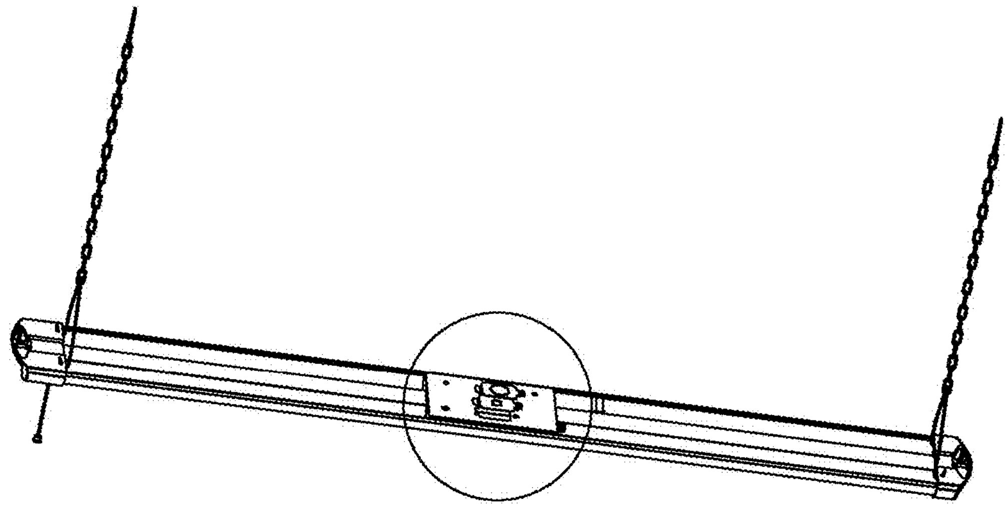
FIG. 5 is a partial enlarged structural diagram of a conductive terminal of the lamp of the present invention.
Figure 5:
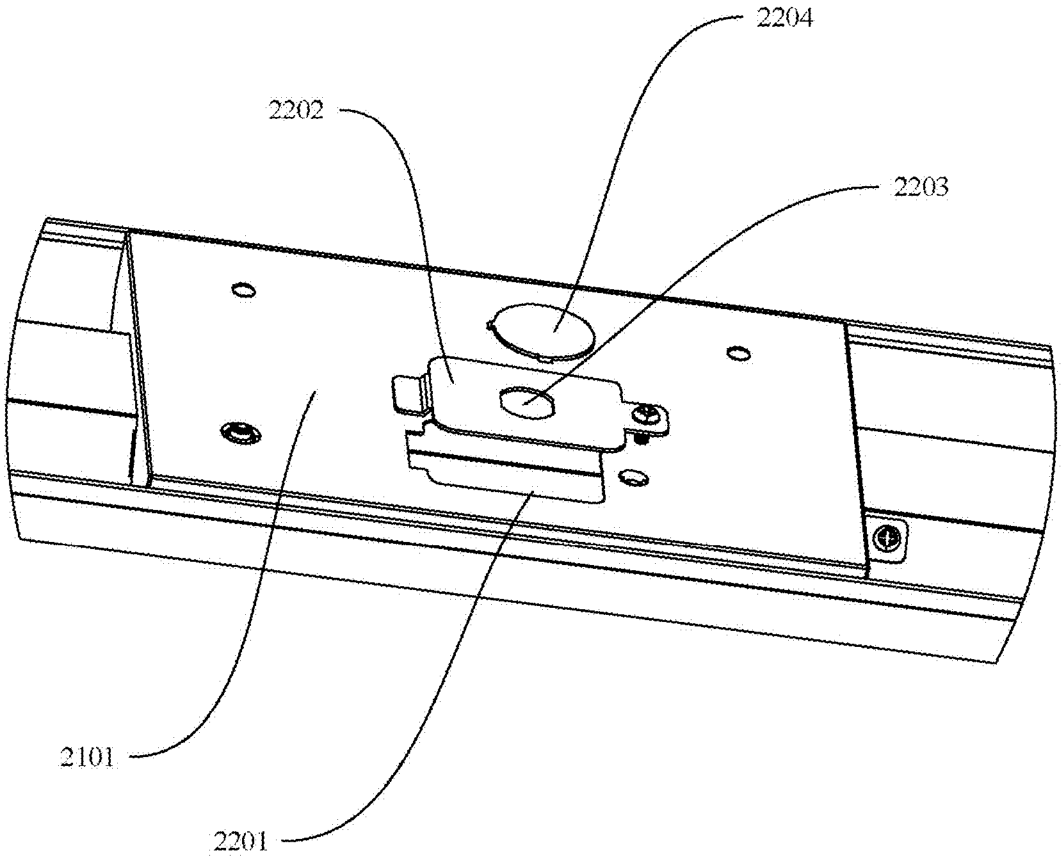

In this embodiment, referring to FIG. 5, the conductive terminal 1004 is arranged on the connecting frame 2001, the bottom plate 2101 is provided with a first through hole 2201, the first through hole 2201 is provided with a first cover plate 2202, the first cover plate 2202 is provided with a first wiring hole 2203, and the power cord 1007 extends outward from the first wiring hole 2203 and is electrically connected to an external power supply, the first wiring hole 2203 is further covered with a hole cover 2204, and the hole cover 2204 is configured for covering and storing the power cord 1007 in the lamp housing 1001. The design of the first through hole 2201 on the bottom plate 2101 and the first cover plate 2202 enables the power cord 1007 to be conveniently electrically connected to the external power supply through the first wiring hole 2203, thereby simplifying the wiring process and reducing the installation time and difficulty.

Moreover, the hole cover 2204 can cover and preserve the power cord 1007 inside the lamp housing 1001, providing additional protection to prevent the power cord from being damaged by the external environment, and enhancing the service life and safety of the power cord.

Figure 6:
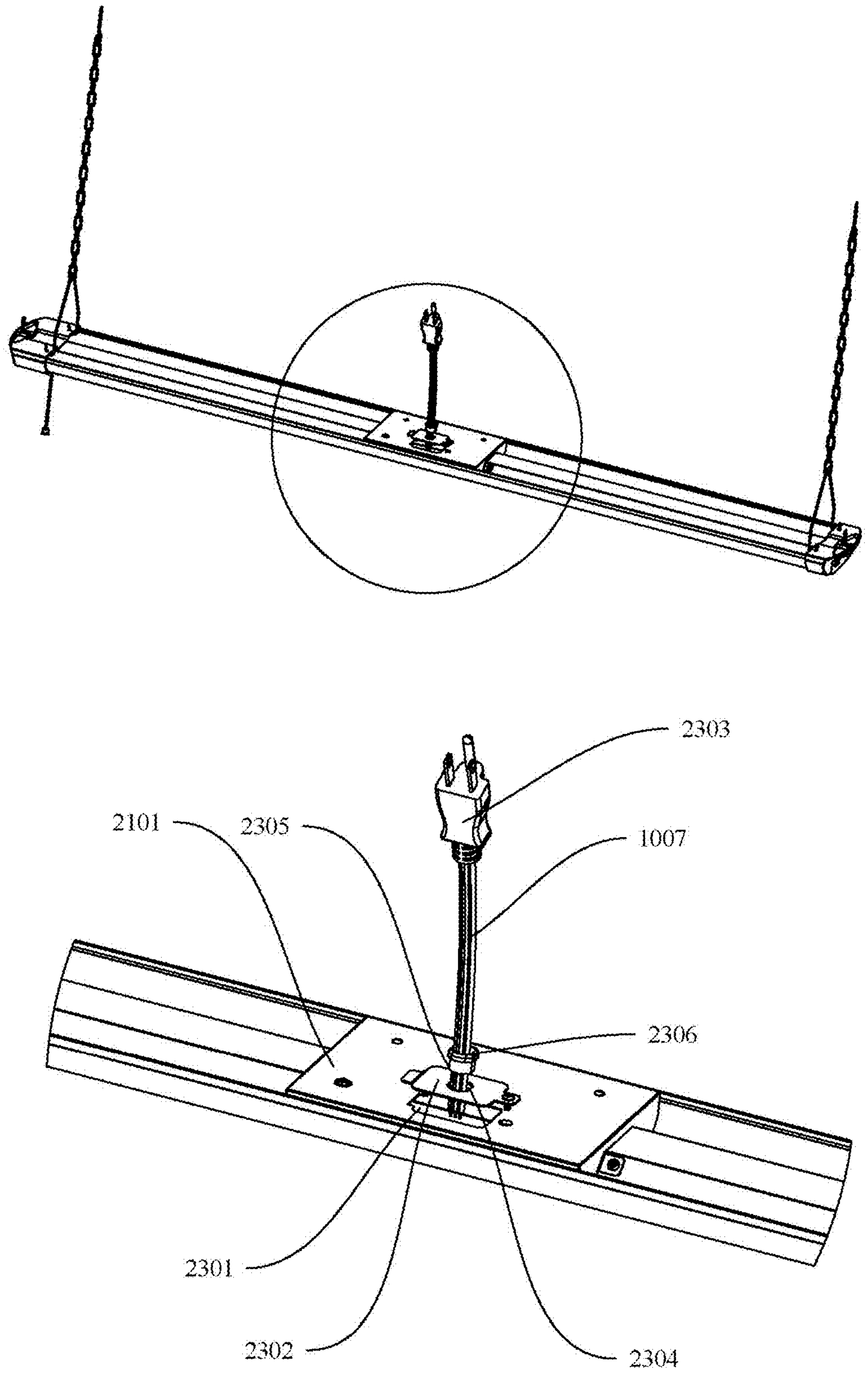
FIG. 6 is a partial enlarged structural diagram of the conductive terminal in another embodiment of the lamp of the present invention.

In another embodiment, referring to FIG. 6, one end of the power cord 1007 is electrically connected to the conductive terminal 1004, the other end of the power cord 1007 is provided with a plug 2303, and the plug 2303 is configured to be electrically connected to the external power supply. The bottom plate 2101 is provided with a second through hole 2301, the second through hole 2301 is provided with a second cover plate 2302, the second cover plate 2302 is provided with a second wiring hole 2304, a snap buckle 2305 is arranged in the second wiring hole 2304, the snap buckle 2305 is provided with a fixing hole 2306, one end of the power cord 1007 extends outward from the fixing hole 2306 and is electrically connected to the external power supply, and the other end of the power cord 1007 is fixed in the fixing hole 2306. With the power cord 1007 having a sufficient length, the user can achieve remote electrical connectivity. The plug 2303 connected to the power cord 1007 in this embodiment enables the lamp 100 to be conveniently connected to the external power supply. Moreover, the fixing hole 2306 can fix the power cord 1007 inside the lamp housing 1001, thereby providing additional protection for the power cord 1007, preventing it from being damaged by the external environment, and enhancing the service life and safety of the power cord 1007.

As another mounting method of the lamp in the present invention, the connecting device includes a hook assembly 3000 arranged on each of two ends of the lamp housing 1001.

Figure 7:
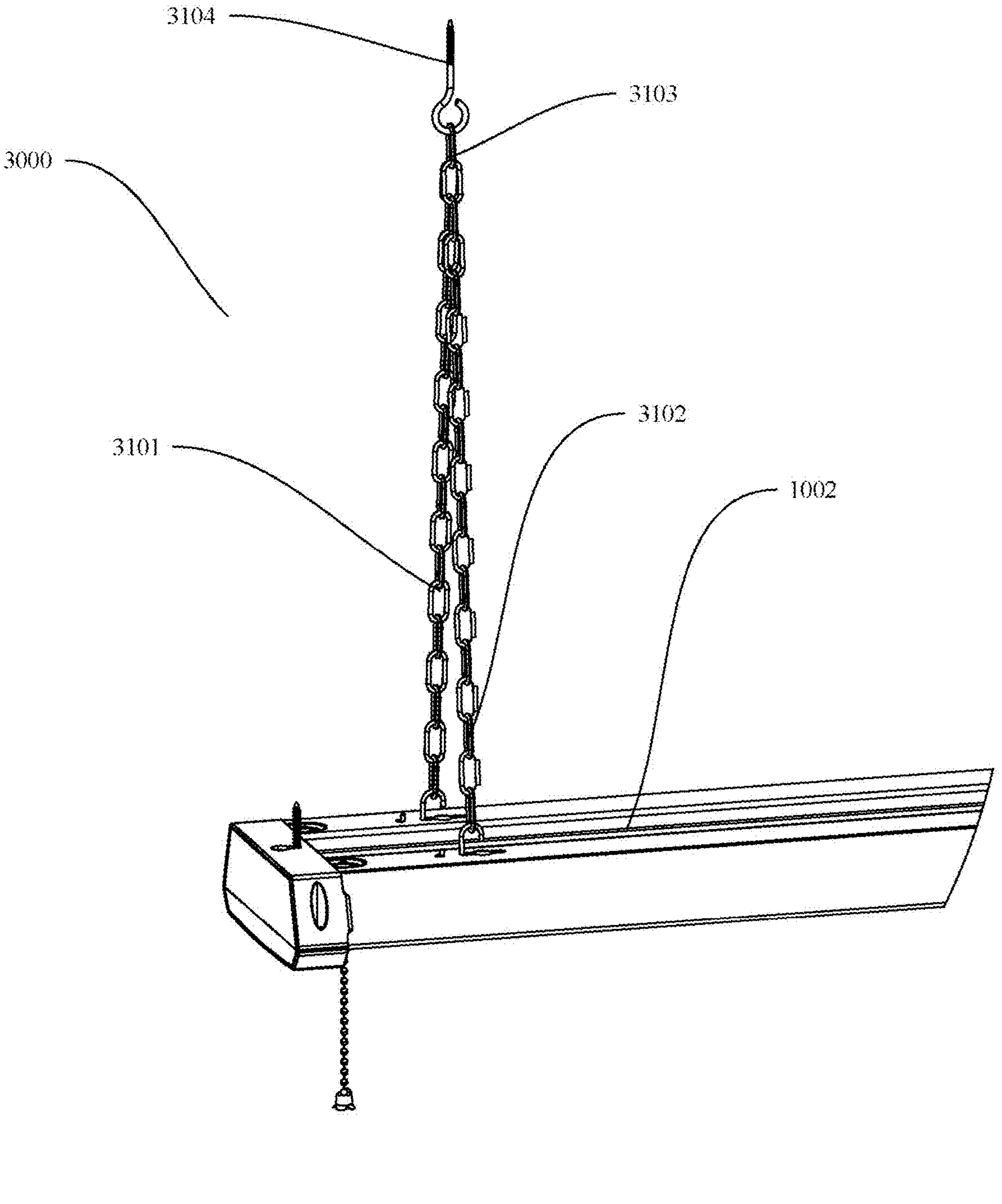
FIG. 7 is a schematic structural diagram of a second mounting method of the lamp of the present invention.

As one of the preferred embodiments of the hook assembly 3000, referring to FIG. 7, the hook assembly 3000 includes a first hanging member 3101, a second hanging member 3102 and a first joining member 3103, one end of the first hanging member 3101 and one end of the second hanging member 3102 are fixedly connected to the lamp housing 1001 respectively, the other ends of the first hanging member 3101 and the second hanging member 3102 intersect and are connected by the first joining member 3103, a wall nail 3104 is connected to the first joining member 3103, and the wall nail 3104 is configured to fixedly connect the hook assembly 3000 to a wall. Through the connection of the first joining member 3103 at the intersection of the first hanging member 3101 and the second hanging member 3102, a stable supporting structure is formed, ensuring that the lamp will not get loose or fall off easily during the use process.

Figure 8:
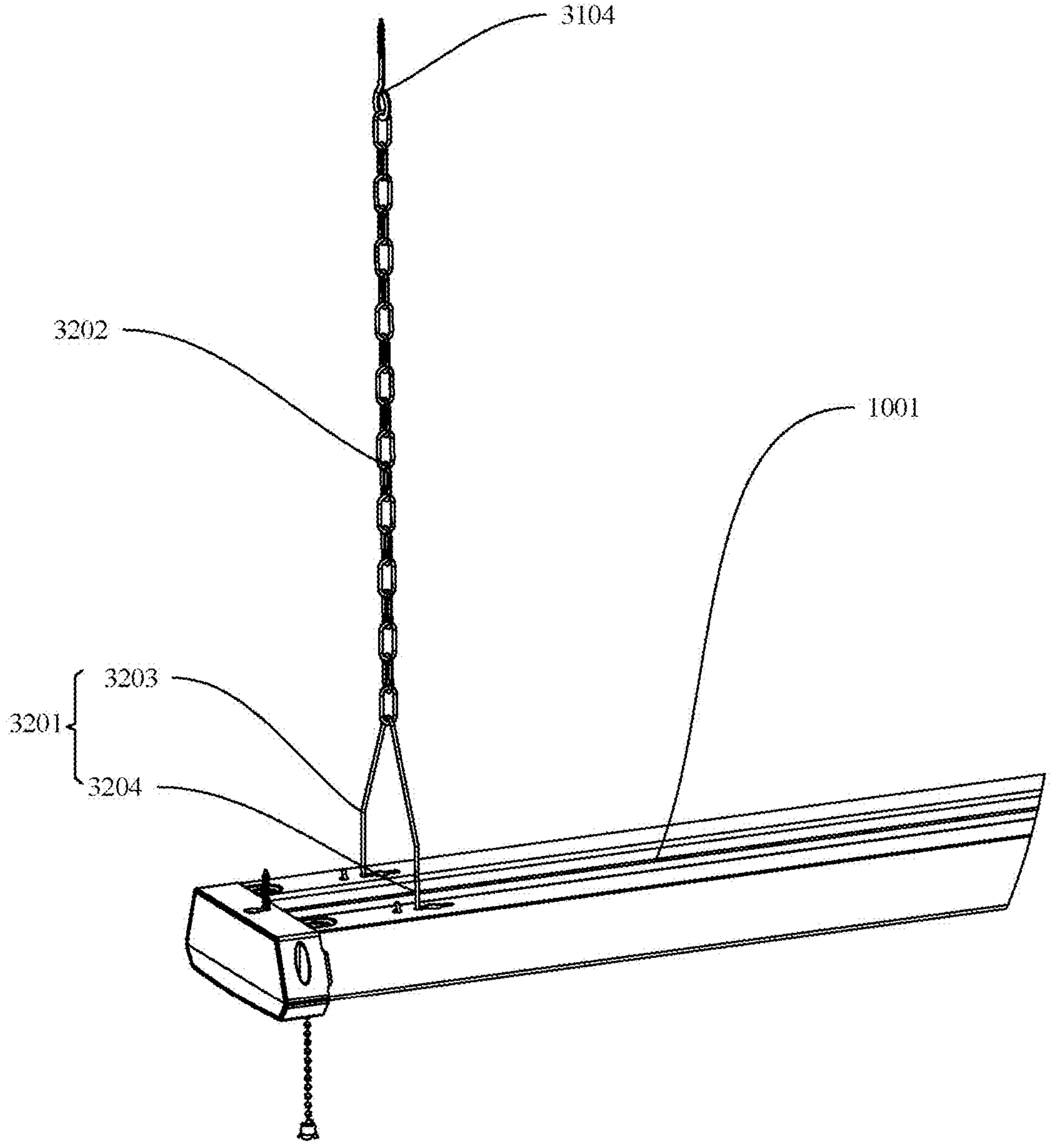
FIG. 8 is a schematic structural diagram of the second mounting method in another embodiment of the lamp of the present invention.

As one of the preferred embodiments of the hook assembly 3000, referring to FIG. 8, the hook assembly 3000 includes a third hanging member 3201 and a fourth hanging member 3202, the third hanging member 3201 includes a first connecting part 3203 and a second connecting part 3204, one end of the first connecting part 3203 and one end of the second connecting part 3204 are respectively fixedly connected to the lamp housing 1001, the other ends of the first connecting part 3203 and the second connecting part 3204 are connected by the fourth hanging member 3202, enabling the third hanging member 3201 to have a V-shaped structure, and the wall nail 3104 is connected to the fourth hanging member 3202 and is configured to fixedly connect the hook assembly 3000 to the wall. The V-shaped structure of the hook assembly 3000 endows the lamp 100 with relatively high stability, ensuring the lamp 100 will not get loose or fall off easily during the use process.

Figure 9:
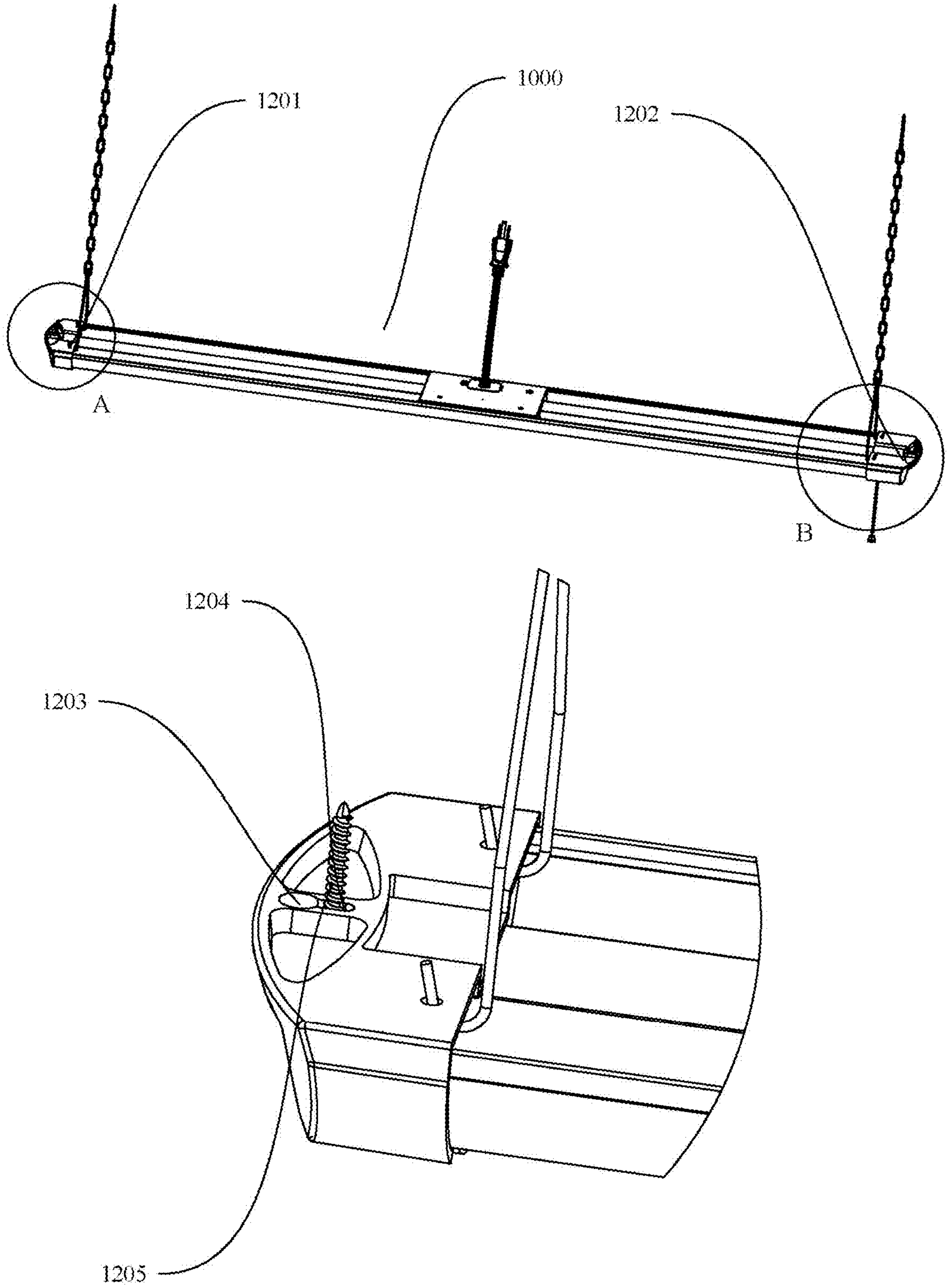
FIG. 9 is a schematic structural diagram of a left end cover and a right end cover of the lamp of the present invention.

In this embodiment, referring to FIG. 9, two ends of the lamp body 1001 are detachably connected to a left end cover 1201 and a right end cover 1202, the left end cover 1201 and the right end cover 1202 are respectively provided with a guide hole 1203 and a limit hole 1204, the guide hole 1203 and the limit hole 1204 are configured to enable a second connecting piece 1205 to pass through so as to connect the lamp 100 to the wall, an edge part of the guide hole 1203 intersects with an edge part of the limit hole 1204, making the guide hole 1203 and the limit hole 1204 connect with each other, and a diameter of the guide hole 1203 is not less than a diameter of the limit hole 1204. The edge parts of the guide hole 1203 and the limit hole 1204 intersect and get connected, ensuring that the second connecting piece 1205 can be stably connected. Moreover, the diameter of the guide hole 1203 is not less than that of the limit hole 1204, which further enhances the stability of the connection, ensuring that the lamp will not get loose or fall off during the use process.

In this embodiment, referring to FIG. 10 to FIG. 11, a first mounting seat 1206 is electrically connected to one end of the light source board 1002, a switching device 1207 is arranged in the first mounting seat 1206, the switching device 1207 is electrically connected to the light source board 1002, the right end cover 1202 is further provided with a first wiring port 1208, and the first wiring port 1208 is connected to the first mounting seat 1206, enabling the external power supply to be plugged into the first wiring port 1208 and be electrically connected to the light source board 1002. A second mounting seat 1209 is electrically connected to the other end of the light source board 1002, the left end cover 1201 is provided with a second wiring port 1210, and the second wiring port 1201 is connected to the second mounting seat 1209, enabling the external power supply to be plugged into the second wiring port 1210 and be electrically connected to the light source board 1002. The switching device 1207 is arranged in the first mounting seat 1206 within the right end cover 1202 to achieve an integrated design of the switching device and the lamp. This simplifies the structure of the lamp, making the whole more compact. It also reduces the exposure of external wires, enhancing the aesthetics and safety of the device.

The above description only describes embodiments of the present invention, and is not intended to limit the present invention; various modifications and changes can be made to the present invention. Any modifications, equivalent substitutions, and improvements made within the spirit and scope of the present invention are intended to be included within the scope of the present invention.

What is claimed is:

1. An easy-to-install lamp, comprising:

a lamp body, wherein the lamp body comprises a lamp housing, a light source board is arranged in the lamp housing, a lamp cover is arranged on the light source board, the lamp housing is equipped with a conductive terminal, one end of the conductive terminals is electrically connected to the light source board, and the other end of the conductive terminals is configured to be electrically connected to an external power source, enabling the lamp to be powered on and work; and a connecting device, wherein one end of the connecting device is configured to be detachably connected to an external wall, and the other end of the connecting device is connected to the lamp housing;

wherein the lamp body is further equipped with a circuit board, the circuit board is electrically connected to the light source board and the conductive terminal, the conductive terminal is configured to be electrically connected to the external power source through a power cord, and a length of the power cord ranges from 500 mm to 5000 mm;

wherein the connecting device comprises a connecting frame, one end of the connecting frame is configured to be detachably connected to a mounting bracket on the external wall, and the other end of the connecting frame is detachably connected to the lamp housing.

2. The lamp according to claim 1, wherein the connecting device comprises a hook assembly arranged on each of two ends of the lamp housing.

3. The lamp according to claim 1, wherein at least one clamping block extending in a direction away from the connecting frame is arranged on the connecting frame, at least one clamping groove cooperating with the clamping block is arranged on the lamp housing, and the clamping block is inserted into the clamping groove, enabling the lamp body to be detachably connected to the connecting frame.

4. The lamp according to claim 3, wherein the connecting frame comprises a bottom plate and a connecting plate extending downward from an edge of each of two ends of the bottom plate, each of the two connecting plates comprises a first connecting plate and a second connecting plate, the first connecting plate and the second connecting plate are arranged in a relatively inclined manner, and at least one of the clamping blocks is arranged at an edge of an inner sidewall of one end of the first connecting plate and the second connecting plate.

5. The lamp according to claim 4, wherein the lamp housing comprises a top wall and a first side plate extending obliquely downward from each of two sides of the top wall, a second side plate extends obliquely upward from an edge of the first side plate, and at least one clamping groove corresponding to the clamping block is arranged on the first side plate.

6. The lamp according to claim 5, wherein an inner sidewall of the first connecting plate and an inner sidewall of the second connecting plate respectively abut against an outer sidewall of the first side plate, an outer sidewall of the first connecting plate and an outer sidewall of the second connecting plate abut against an inner sidewall of the second side plate, and the clamping block is inserted into the clamping groove, enabling the connecting frame to be detachably connected to the lamp housing.

7. The lamp according to claim 6, wherein a connecting block extends from an edge of the inner sidewall of the first connecting plate at the other end, and the connecting block is able to be attached to the first side plate and is detachably connected through a first connecting piece.

8. The lamp according to claim 7, wherein the connecting block is provided with a first connecting hole, the first side plate is provided with a second connecting hole at a position corresponding to the first connecting hole, and the first connecting piece passes through the first connecting hole and extends into the second connecting hole, enabling the connecting frame to be detachably connected to the lamp body.

9. The lamp according to claim 8, wherein the second side plate is provided with an arc-shaped structure, and at least one part of the outer sidewalls of the first connecting plate and the second connecting plate is provided with an arc-shaped structure matched with the second side plate, enabling the outer sidewalls of the first connecting plate and the second connecting plate to be abutted with the second side plate.

10. The lamp according to claim 9, wherein the connecting frame further comprises an abutting plate extending downwards from two side edges of the connecting frame, and an edge of a bottom end of the abutting plate is abutted against an inner wall surface of the second side plate.

11. The lamp according to claim 10, wherein the conductive terminal is arranged on the connecting frame, the bottom plate is provided with a first through hole, the first through hole is provided with a first cover plate, the first cover plate is provided with a first wiring hole, and the power cord extends outward from the first wiring hole and is electrically connected to an external power supply.

12. The lamp according to claim 11, wherein the first wiring hole is further covered with a hole cover, and the hole cover is configured for covering and storing the power cord in the lamp housing.

13. The lamp according to claim 10, wherein one end of the power cord is electrically connected to the conductive terminal, the other end of the power cord is provided with a plug, and the plug is configured to be electrically connected to the external power supply.

14. The lamp according to claim 13, wherein the bottom plate is provided with a second through hole, the second through hole is provided with a second cover plate, the second cover plate is provided with a second wiring hole, a snap buckle is arranged in the second wiring hole, the snap buckle is provided with a fixing hole, one end of the power cord is fixed in the fixing hole, and the other end of the power cord extends outward from the fixing hole and is electrically connected to the external power supply.

15. The lamp according to claim 2, wherein the hook assembly comprises a first hanging member, a second hanging member and a first joining member, one end of the first hanging member and one end of the second hanging member are fixedly connected to the lamp housing respectively, the other ends of the first hanging member and the second hanging member intersect and are connected by the first joining member, a wall nail is connected to the first joining member, and the wall nail is configured to fixedly connect the hook assembly to a wall.

16. The lamp according to claim 2, wherein the hook assembly comprises a third hanging member and a fourth hanging member, the third hanging member includes a first connecting part and a second connecting part, one end of the first connecting part and one end of the second connecting part are respectively fixedly connected to the lamp housing, the other ends of the first connecting part and the second connecting part are connected by the fourth hanging member, enabling the third hanging member to have a V-shaped structure, and the wall nail is connected to the fourth hanging member and is configured to fixedly connect the hook assembly to the wall.

17. An easy-to-install lamp, comprising:

a lamp body, wherein the lamp body comprises a lamp housing, a light source board is arranged in the lamp housing, a lamp cover is arranged on the light source board, the lamp housing is equipped with a conductive terminal, one end of the conductive terminals is electrically connected to the light source board, and the other end of the conductive terminals is configured to be electrically connected to an external power source, enabling the lamp to be powered on and work; and a connecting device, wherein one end of the connecting device is configured to be detachably connected to an external wall, and the other end of the connecting device is connected to the lamp housing;

wherein two ends of the lamp body are detachably connected to a left end cover and a right end cover, the left end cover and the right end cover are respectively provided with a guide hole and a limit hole, the guide hole and the limit hole are configured to enable a second connecting piece to pass through so as to connect the lamp to the wall, an edge part of the guide hole intersects with an edge part of the limit hole, making the guide hole and the limit hole connect with each other, and a diameter of the guide hole is not less than a diameter of the limit hole.

18. The lamp according to claim 17, wherein a first mounting seat is electrically connected to one end of the light source board, a switching device is arranged in the first mounting seat, the switching device is electrically connected to the light source board, the right end cover is further provided with a first wiring port, the first wiring port is connected to the first mounting seat, enabling the external power supply to be plugged into the first wiring port and be electrically connected to the light source board, a second mounting seat is electrically connected to the other end of the light source board, the left end cover is provided with a second wiring port, and the second wiring port is connected to the second mounting seat, enabling the external power supply to be plugged into the second wiring port and be electrically connected to the light source board.

19. An easy-to-install lamp, comprising:

a lamp body, wherein the lamp body comprises a lamp housing, a light source board is arranged in the lamp housing, a lamp cover is arranged on the light source board, the lamp housing is equipped with a conductive terminal, one end of the conductive terminals is electrically connected to the light source board, and the other end of the conductive terminals is configured to be electrically connected to an external power source, enabling the lamp to be powered on and work; and a connecting device, wherein one end of the connecting device is configured to be detachably connected to an external wall, and the other end of the connecting device is connected to the lamp housing;

wherein the lamp body is further equipped with a circuit board, the circuit board is electrically connected to the light source board and the conductive terminal, the conductive terminal is configured to be electrically connected to the external power source through a power cord, and a length of the power cord ranges from 500 mm to 5000 mm;

wherein the connecting device comprises a hook assembly arranged on each of two ends of the lamp housing;

wherein the hook assembly comprises a first hanging member, a second hanging member and a first joining member, one end of the first hanging member and one end of the second hanging member are fixedly connected to the lamp housing respectively, the other ends of the first hanging member and the second hanging member intersect and are connected by the first joining member, a wall nail is connected to the first joining member, and the wall nail is configured to fixedly connect the hook assembly to a wall.

* * * * *